(12) United States Patent
Fuller et al.

(10) Patent No.: US 11,262,088 B2
(45) Date of Patent: Mar. 1, 2022

(54) ADJUSTING SETTINGS OF ENVIRONMENTAL DEVICES CONNECTED VIA A NETWORK TO AN AUTOMATION HUB

(71) Applicant: International Business Machines Corporation, Armonk, NY (US)

(72) Inventors: Cameron Fuller, Washington, DC (US); Emma R. Tucker, Austin, TX (US); Brian L. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/804,023

(22) Filed: Nov. 6, 2017

(65) Prior Publication Data

US 2019/0137128 A1    May 9, 2019

(51) Int. Cl.
  *G05B 19/048*  (2006.01)
  *F24F 11/30*  (2018.01)
       (Continued)

(52) U.S. Cl.
  CPC .............. *F24F 11/30* (2018.01); *F24F 11/62* (2018.01); *G05B 15/02* (2013.01); *G05B 19/048* (2013.01);
       (Continued)

(58) Field of Classification Search
  CPC ........ F24F 2110/10; F24F 11/62; F24F 11/30; F24F 11/63; G05B 19/048;
       (Continued)

(56) References Cited

U.S. PATENT DOCUMENTS 9,817,383 B1 * 11/2017 Sinha ................. G05B 13/0205
9,858,739 B1 * 1/2018 Johnson ................. H04W 76/10
       (Continued)

FOREIGN PATENT DOCUMENTS

JP          20074565          1/2007
KR    20057000153 A  *   1/2005    ............... H04N 5/57

OTHER PUBLICATIONS

Neßelrath, R., Lu, C., Schulz, C.H., Frey, J. and Alexandersson, J., 2011. A gesture based system for context-sensitive interaction with smart homes. In Ambient Assisted Living (pp. 209-219). Springer, Berlin, Heidelberg. (Year: 2011).*

(Continued)

*Primary Examiner* — Rocio Del Mar Perez-Velez
*Assistant Examiner* — Alicia M. Choi
(74) *Attorney, Agent, or Firm* — Schmeiser, Olsen & Watts, LLP; Nicholas L. Cadmus (57) ABSTRACT

A method is provided for adjusting settings of environmental devices of a system connected via a network to an automation hub. A prompt is received to start playing content on an appliance of the system during a time period. The content is played during the time period. A profile associated with the content is requested, where the profile includes a set of parameters for the environmental devices. The profile is received during a predetermined period of time. While the environmental devices are in operation, the settings of the environmental devices are adjusted based on the set of parameters.

20 Claims, 4 Drawing Sheets

(51) Int. Cl.
  *G06F 3/16*   (2006.01)
  *F24F 11/62*  (2018.01)
  *G05B 15/02*  (2006.01)
  *G06N 5/02*       (2006.01)
  *F24F 11/63*      (2018.01)
  *F24F 110/10*     (2018.01)
  *H05B 47/19*      (2020.01)
  *H05B 47/105*     (2020.01)

(52) U.S. Cl.
  CPC ............... *G06F 3/16* (2013.01); *F24F 11/63* (2018.01); *F24F 2110/10* (2018.01); *G05B 2219/2614* (2013.01); *G05B 2219/2642* (2013.01); *G06N 5/022* (2013.01); *H05B 47/105* (2020.01); *H05B 47/19* (2020.01)

(58) Field of Classification Search
  CPC .... G05B 2219/2614; G05B 2219/2642; G05B 15/02; G06F 3/16; G06N 5/022; H05B 37/0227; H05B 37/0272; H04L 12/2803
  USPC ......................................................... 700/278
  See application file for complete search history.

(56) References Cited

U.S. PATENT DOCUMENTS

| | | | |
|---|---|---|---|
| 9,938,765 B2* | 4/2018 | Berman | H04L 12/2827 |
| 2008/0153537 A1* | 6/2008 | Khawand | H03G 3/32 |
| | | | 455/550.1 |
| 2008/0238937 A1* | 10/2008 | Muraki | A63F 13/06 |
| | | | 345/619 |
| 2009/0189373 A1* | 7/2009 | Schramm | B60R 11/0264 |
| | | | 280/731 |
| 2010/0214578 A1 | 8/2010 | Lewnard et al. | |
| 2011/0032423 A1* | 2/2011 | Jing | H04L 12/282 |
| | | | 348/552 |
| 2011/0044604 A1* | 2/2011 | Brokken | G06F 3/016 |
| | | | 386/239 |
| 2013/0054863 A1 | 2/2013 | Imes et al. | |
| 2013/0061258 A1* | 3/2013 | Takaya | H04H 60/45 |
| | | | 725/10 |
| 2013/0127369 A1* | 5/2013 | Campbell | H05B 45/00 |
| | | | 315/292 |
| 2016/0102879 A1* | 4/2016 | Guest | G05B 15/02 |
| | | | 700/276 |
| 2016/0165002 A1* | 6/2016 | LeBeau | H04W 4/21 |
| | | | 709/204 |
| 2016/0274556 A1* | 9/2016 | Murphy | G05B 19/048 |
| 2016/0314803 A1* | 10/2016 | Stone | G10L 25/48 |
| 2017/0070775 A1* | 3/2017 | Taxier | H04L 12/2825 |
| 2017/0191695 A1* | 7/2017 | Bruhn | G05B 15/02 |
| 2018/0187484 A1* | 7/2018 | Hebeisen | F24F 11/62 |
| 2018/0196432 A1* | 7/2018 | Krupat | A61B 5/165 |
| 2018/0234726 A1* | 8/2018 | Allstead, Jr. | H04L 65/4076 |
| 2018/0248972 A1* | 8/2018 | Ahuja | H04L 67/306 |
| 2020/0256581 A1* | 8/2020 | Wang | F24F 11/80 |

OTHER PUBLICATIONS

Stahl, C., Frey, J., Alexandersson, J. and Brandherm, B., 2011. Synchronized realities. Journal of Ambient Intelligence and Smart Environments, 3(1), pp. 13-25. (Year: 2011).*

Darrell Etherington, This App Turns Your Philips Hue System Into Dynamic, Atmospheric Home Theater Lighting, Posted Mar. 18, 2015, https://techcrunch.com/2015/03/18/this-app-turns-your-philips-hue-system-into-dynamic-atmospheric-home-theater-lighting/, 4 pages.

* cited by examiner

ADJUSTING SETTINGS OF ENVIRONMENTAL DEVICES CONNECTED VIA A NETWORK TO AN AUTOMATION HUB

TECHNICAL FIELD

The present invention relates to adjusting settings of environmental devices connected via a network to an automation hub.

BACKGROUND

Numerous devices and communication protocols are being continuously used in the electronics industry. Despite technological advancements within this industry, including Internet of Things (IoT) and smart home technology, consumer demands are ever increasing. Consumers wish to enhance their experience by connecting more and more electronic devices to a single control system. Automation products, such as smart home automation hubs, attempt to remedy this problem.

A smart home automation hub is a hardware device that connects devices on a home automation network and controls communications among them. The devices on the home automation network may include thermostats, light bulbs, wall outlets and switches, door locks, energy monitors, window coverings, appliances, motion sensors, leak sensors, and wireless cameras, among others. These non-computing devices typically include smart sensors, which enable control and communication.

SUMMARY

In one embodiment, the present invention provides a method executed by an automation hub configured to adjust settings of environmental devices connected via a network to the automation hub. The method comprises: receiving, from a device, a prompt to start playing content on an appliance of the system during a time period; playing the content on the appliance of the system during the time period; requesting, from a settings database of a content provider, a first profile associated with the content, wherein the first profile includes a first set of parameters for the environmental devices; and after the requesting and in response to receiving, from the settings database of the content provider, the first profile during a predetermined period of time, adjusting, while the environmental devices are in operation, the settings of the environment devices based on the first set of parameters of the first profile.

In another embodiment, the present invention provides a computer system. The computer system comprises: one or more processors, one or more memories, and one or more computer-readable hardware storage devices. The one or more computer-readable hardware storage devices contain program code executable by the one or more processors via the one or more memories to implement method. The method is executed by a cognitive analysis application to generate a modified profile for parameters of environmental devices connected via a network to an automation hub. The method comprises: receiving, by the one or more processors from a content provider, a first profile for content being played on an appliance synchronized to the automation hub, wherein the first profile includes a first set of parameters of the environmental devices. In response to a determination that a second profile is not currently cached, the method further comprises: receiving, by the one or more processors from the appliance, the second profile; utilizing, by the one or more processors, an algorithm to perform an analysis on the second profile; in response to the analysis, identifying, by the one or more processors, a second set of parameters for the environmental devices, wherein the second set of parameters for the environmental devices are associated with user preference settings for the environmental devices; and modifying, by the one or more processors, the first set of parameters of the environmental devices based on the second set of parameters for the environmental devices to create a modified profile. In response to a determination that the second profile is currently cached, the method comprises: creating, by the one or more processors, the modified profile based on the parameters of the environmental devices from the cached second profile.

In an additional embodiment, the present invention provides a computer program product. The computer program product comprises one or more computer-readable hardware storage devices having computer-readable program code stored therein. The computer-readable program code contain instructions citable by one or more processors of a computer system to implement a method to adjust settings of environmental devices connected via a network to an automation hub. The method comprises: receiving, by the one or more processors from a device, a prompt to start playing content on an appliance of the system during a time period; playing, by the one or more processors, the content on the appliance of the system during the time period; requesting, by the one or more processors from a settings database of a content provider, a first profile associated with the content, wherein the first profile includes a first set of parameters for the environmental devices; and after the requesting and in response to receiving, by the one or more processors from the settings database of the content provider, the first profile during a predetermined period of time, adjusting, while the environmental devices are in operation, the settings of the environment devices based on the first set of parameters of the first profile.

DETAILED DESCRIPTION

Consumers face numerous problems with smart home automation systems. First, setting up an automation system initially is quite costly. Further, despite the emergence of smart technologies and appliances within the home, the lack of interoperability between these devices has slowed progress and delayed efficiencies sought by energy companies and technology providers. However, solutions that optimize the connection between smart home control systems and entertainment systems may enhance the synchronization between each.

Embodiments of the present invention provide an approach to adjust settings of environmental devices connected via a network to an automation hub. The settings of the environmental devices may be adjusted based on a first profile (e.g., a recommended profile) provided by a content provider. In other examples, in the presence of a second profile (e.g., a user profile), the settings of the environmental devices may be adjusted based on modifying the first profile in light of the second profile to meet the users preferences and needs. Embodiments of the present invention remedy problems involved with current home automation systems, which fail to include a cognitive feedback approach to capture user preference settings for the environmental devices and inform the content provider of the user preference settings. This feedback mechanism allows for an adjustment of the first profile, generated by the content provider, based on user preference settings of the environmental devices.

Figure 1:
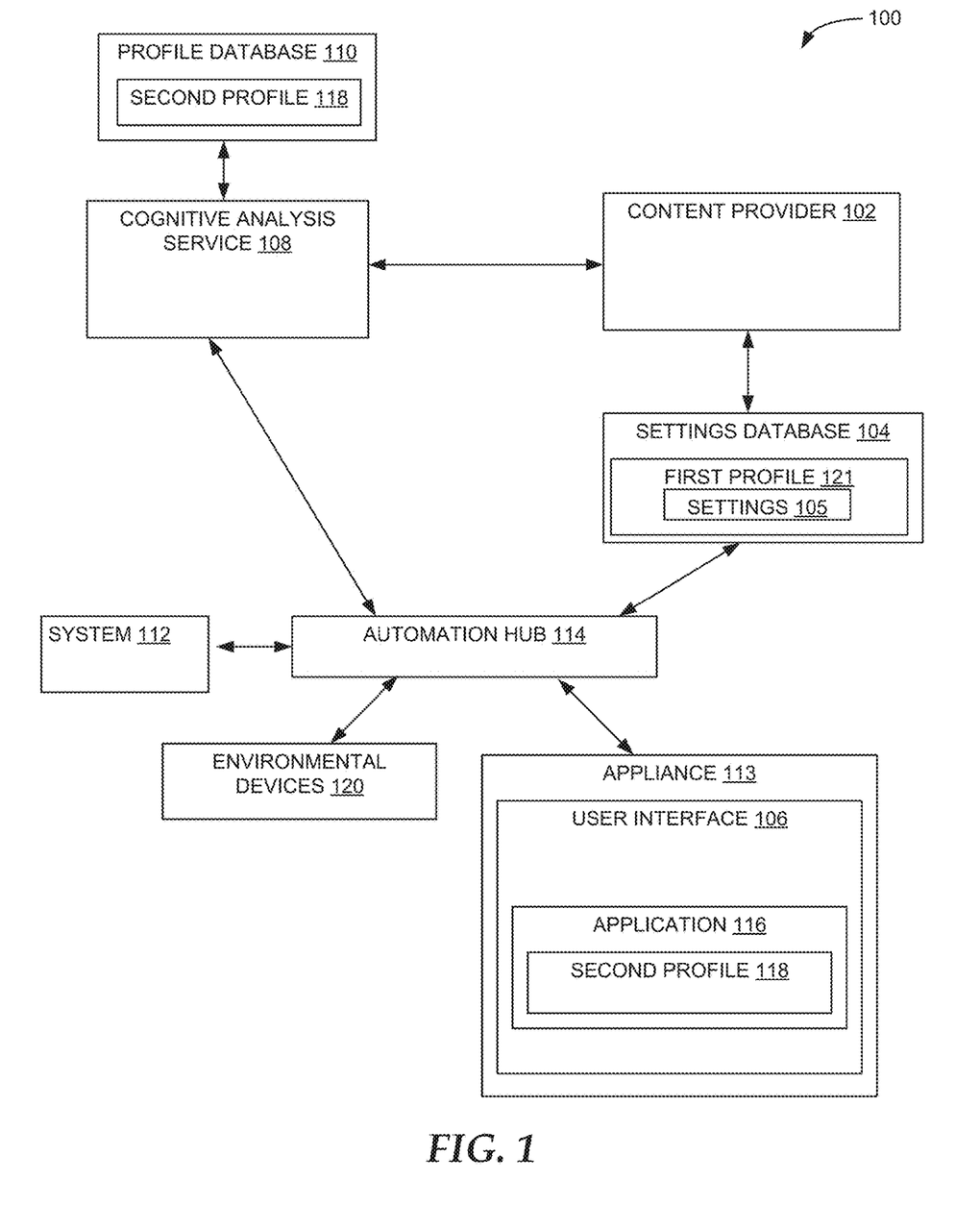
FIG. 1 is a block diagram of a system configured to adjust settings of environmental devices connected via a network to an automation hub, in accordance with embodiments of the present invention.

FIG. 1 is a block diagram of a system configured to adjust settings of environmental devices connected via a network to an automation hub, in accordance with embodiments of the present invention.

A system 100 configured to adjust settings of environmental devices 120 may include components, which may be connected or synchronized via a network to an automation hub 114. The components may include: a system 112, the environmental devices 120, an appliance 113, a cognitive analysis service 108, a content provider 102, a profile database 110, and/or a settings database 104, among others.

In a merely illustrative example, the appliance 113 may be a television and/or a device which may display content, such as video content and/or audio content. The appliance 113 may include a user interface 106. An application 116 and/or a second profile 118 (e.g., a user profile), among other components, may be displayed on the user interface 106 during a time period.

In an example, a user may interact with the user interface 106 of the appliance 113 via a device to create the second profile 118 and/or modify the second profile 118 during the time period. The device may be a remote controller, a stylus pen, a mouse, or a finger of the user, among other examples. Modification of the second profile 118 may include: adding information to the second profile 118, deleting the information from the second profile 118, and/or editing the information of the second profile 118. The information of the second profile 118 may include user preferences for parameters of the environmental devices 120 based on the content. The environmental devices 120 may include: a thermostat, light bulbs, an audio system, window coverings, and/or additional appliances, among others.

In an example, the system 112 may be an entertainment system, a cable box provider, or a streaming device, among other devices. The automation hub 114 may be synchronized to a settings database 104 and also be cognitive analysis service 108. The settings database 104 may be synchronized to the content provider 102. The content provider 102, may be synchronized to the cognitive analysis service 108. The content provider 102 may utilize the synchronization between the components and the automation hub 114 to improve a home immersive viewing experience of the user. The cognitive analysis service 108 may be synchronized to the profile database 110.

The settings database 104 may include a first profile 121 (e.g., a recommended profile) associated with the content that may be displayed on the appliance 113. The first profile 121 of the settings database 104 may include settings 105 and a set of parameters for the environmental devices 120 based on the content.

In an example, the automation hub 114 may modify parameters of the environmental devices 120 in response to a condition being met. For example, in response to the condition (e.g., a time of a day) being met, the automation hub 114 may turn the light bulbs on or off. In other examples, in response to the condition (e.g., the time of the day) being met, the automation hub 114 may turn on or off an additional appliance (e.g., a coffee maker and/or an automatic pet feeding system).

In other examples, in response to the condition (e.g., the time of the day) being met, the automation hub 114 may open or close the additional appliance (e.g., a garage door and/or window coverings). In another example, in response to the condition (e.g., a temperature on the thermostat) being met, the automation hub 114 may turn on or off the additional appliance (e.g., the air conditioning unit). These examples are merely illustrative and additional examples are contemplated.

Additionally, the profile database 110 may include the second profile 118, a set of user preference parameters for the environmental devices 120, and/or a modified profile generated by the cognitive analysis service 108 in light of differences between the settings 105 of the first profile 121 and settings of the second profile 118.

The cognitive analysis service 108 may act as a cognitive agent to consumer user preference data for the environmental devices 120. The cognitive analysis service 108 may then use this information to provide insight to the content provider 102 regarding user preference settings for the environmental devices 120. The user insight may give the content provider 102 a competitive advantage against other content providers who do not receive this insight.

In some examples, the content provider 102 may not be subscribed to receive insights from the cognitive analysis service 108. In this example, the content provider 102 may utilize the settings 105 of the first profile 121 to adjust the settings of the environmental devices 120.

Figure 2:
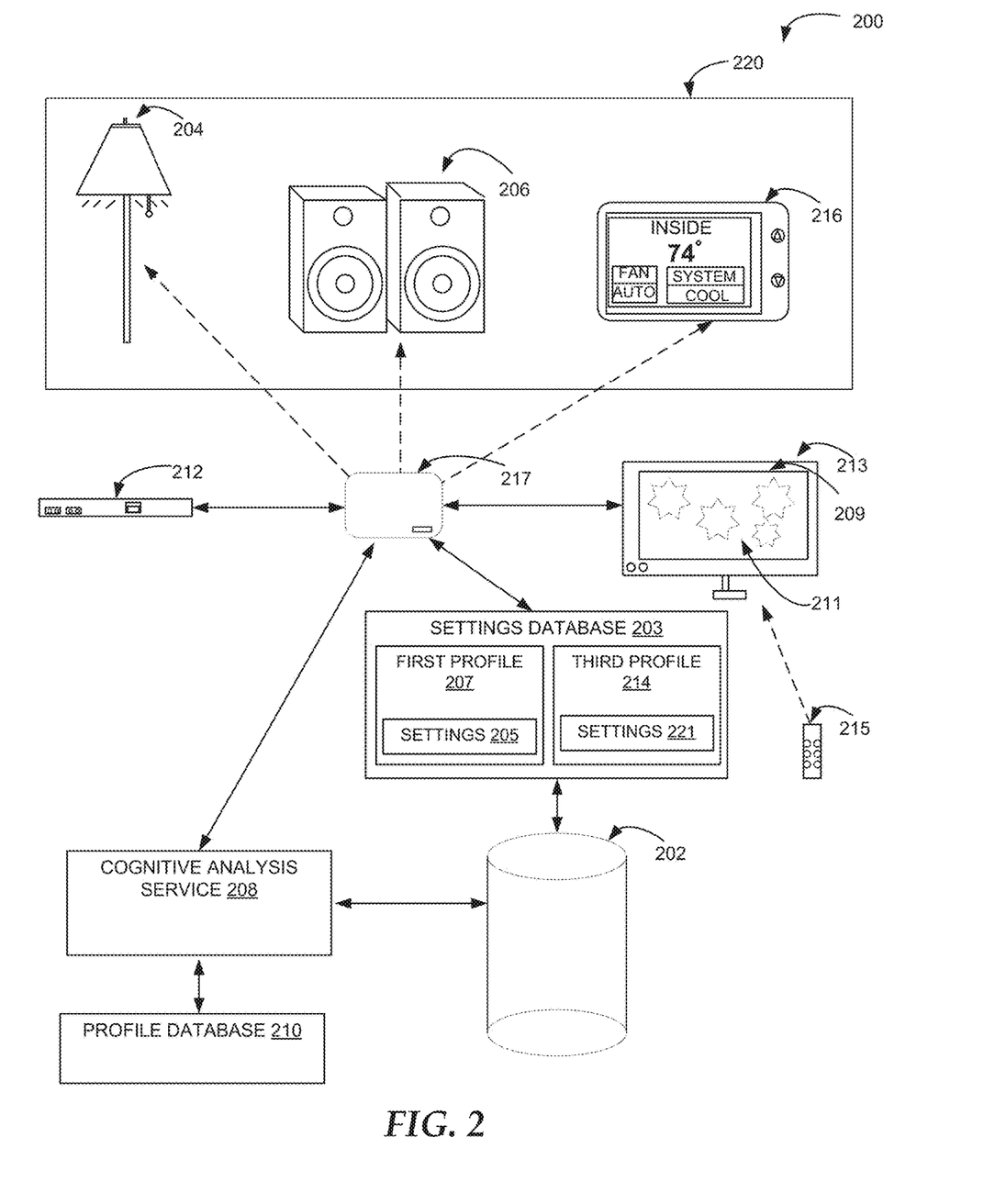
FIG. 2 illustrates a schematic diagram configured to adjust settings of environmental devices connected via network to an automation hub, in accordance with embodiments of the present invention.
Figure 3:
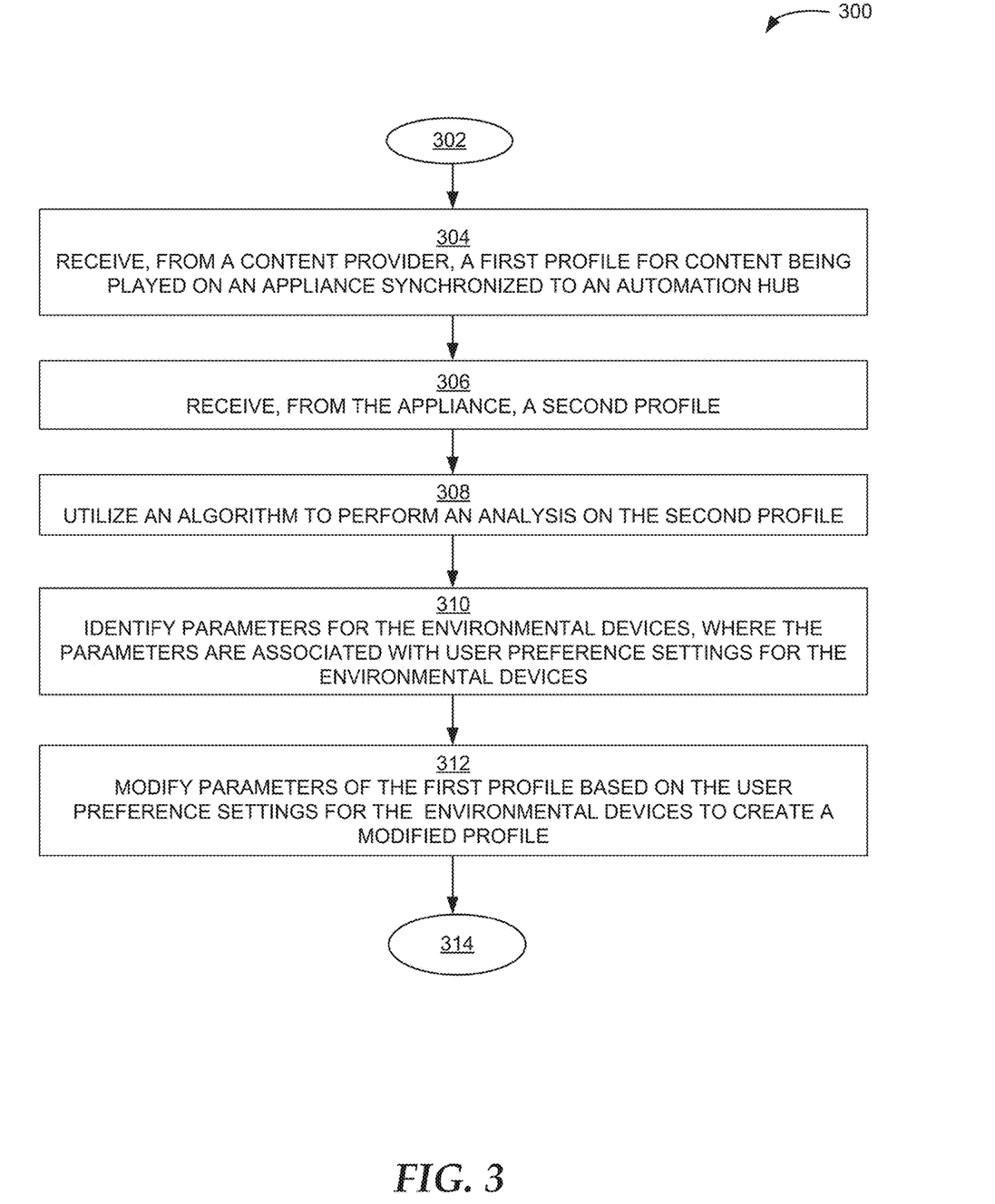
FIG. 3 is a flowchart of a process executed by a cognitive analysis service synchronized to an automation hub and to a content provider, where the cognitive analysis service is configured generate a modified profile for parameters of environmental devices connected via a network to the automation hub, in accordance with embodiments of the present invention.
Figure 4:
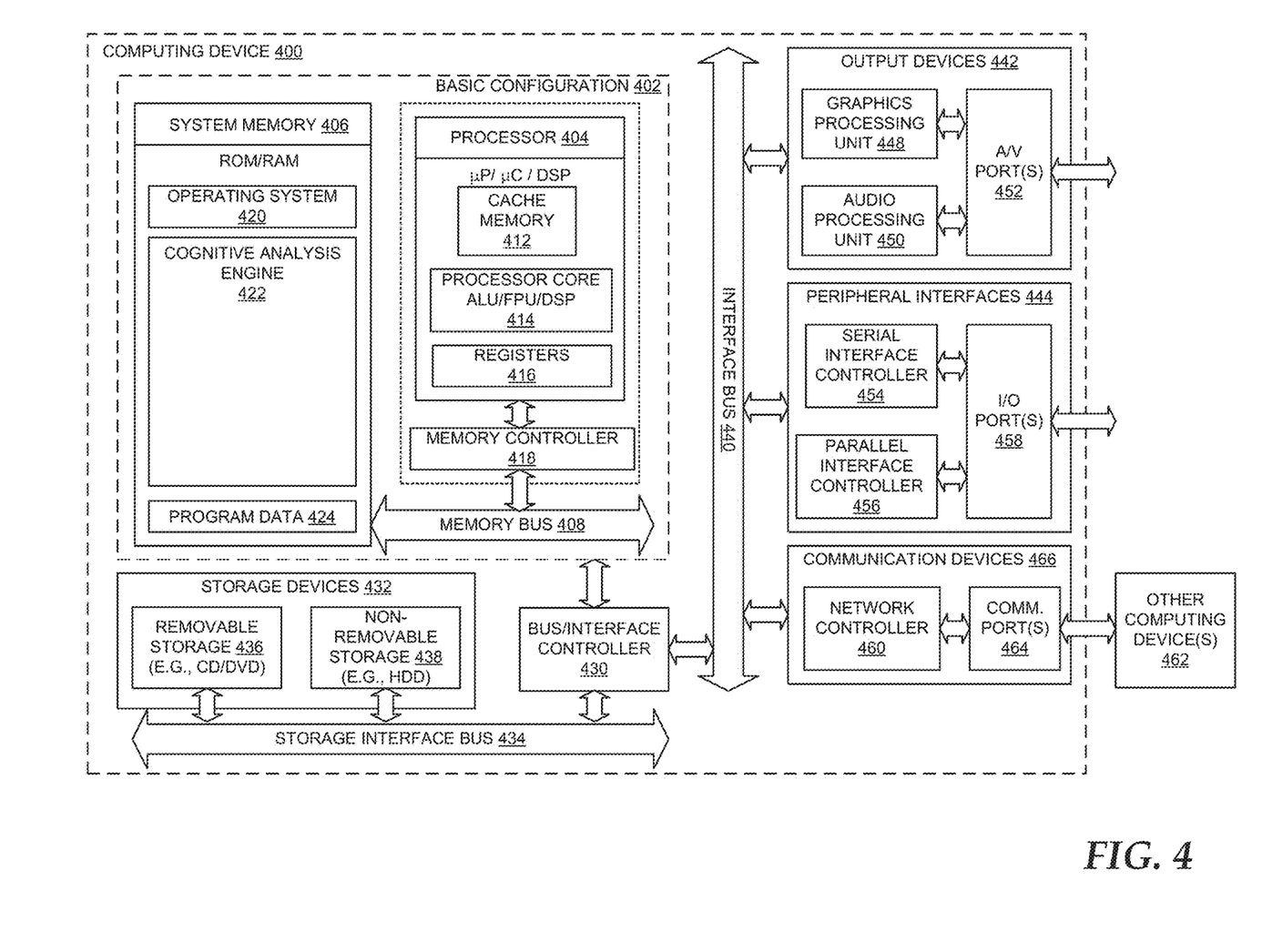
FIG. 4 is a block diagram of a computing device included within the system of FIG. 1 and that implements the processes of FIG. 3, in accordance with embodiments of the present invention.

The functionality of the components shown in FIG. 1 is described in more detail in the discussion of FIG. 2, FIG. 3, and FIG. 4 presented below.

FIG. 2 illustrates a schematic diagram configured to adjust settings of environmental devices connected via a network to an automation hub, in accordance with embodiments of the present invention.

A system 200 is illustrated in FIG. 2. An automation hub 217 of the system 200 may be configured to adjust settings of environmental devices 220. Components of the system may be connected or synchronized via a network to the automation hub 217. The components may include: a system the environmental devices 220, an appliance 213, a cognitive analysis service 208, a content provider 202, a profile database 210, and/or a settings database 203, among others. The environmental devices 220 may include: a thermostat 216, an audio system 206, light bulbs 204, window coverings, and/or additional appliances, among others. The additional appliances may include: an air conditioning unit, a coffee pot, an electronic tool, a toaster, among others.

As an example, the automation hub 217 may receive, from the device 215, a prompt to start playing content 211 on a screen 209 of the appliance 213 during a time period. The device 215 may be a remote controller, a stylus pen, a mouse, or a finger of the user, among other examples. The content 211 may be played on the screen 209 of the appliance 213 during the time period. The appliance 213 may be a television and/or a device which may displays the content 211, such as video content and/or audio content. In an example, the video content may be a television show or a movie, among other examples. The audio content may be associated with the television show or may be audio content independent of the video content (e.g., such as music, an audio book, etc.).

Then, the automation hub 217 may request, from the settings database 203, a first profile 207 (e.g., a recommended profile) associated with the content 211. The first profile 207 may include settings 205 (e.g., recommended settings) for the environmental devices 220 based on the content 211. The settings 205 may also include a set of parameters for the environmental devices 220.

For example, the set of parameters for the light bulbs 204, which are associated with the content 211, may include: lighting levels, hues, and/or a speed at which: the light bulbs 204 transition between a first lighting level and a second lighting level, a first hue and a second hue, and/or a first intensity of the first hue and a second intensity of the second hue. Additionally, the set of parameters for the audio system 206, which are associated with the content 211, may include: decibel levels of sound originating from the audio system 206 and/or a speed at which the audio content from the audio system 206 transitions between a first decibel level and a second decibel level. Further, the set of parameters for the thermostat 216, which are associated with the content 211, may include: temperatures and/or a speed at which the temperature of the thermostat 216 transitions between a first temperature and a second temperature during the time period.

In additional examples, the set of parameters for the window coverings, which are associated with the content 211, may include: an openness level of one or more of the window coverings. In further examples, the set of parameters for the additional appliance, which are associated with the content 211, may include: an on position or an off position of the additional appliance.

In this merely illustrative example, the video content may be dark (e.g., a horror movie). The audio content may be associated with the video content. The settings 205 for the environmental devices 220, based on the horror movie video content and the audio content, may include: a dimming of the lighting levels for the light bulbs 204, a dark hue of the light bulbs 204, a decreased decibel level of the sound originating from the audio system 206, a decrease in the temperature of the thermostat 216, and/or a closing of the window coverings, among others.

In another illustrative example, the video content and the audio content may be associated with a children's television show. The settings 205 for the environmental devices 220, based on the audio content and the video content of the children's television show, may include: a light or brighter hue for the light bulbs 204 and/or a closing of the window coverings, among others.

In a further illustrative example, the video content and the audio content may be associated with an action or thriller movie. During a suspenseful scene of the action or thriller movie, the settings 205 for the environmental devices 220, may include, a dimming of the lighting levels for the light bulbs 204, a dark hue of the light bulbs 204, a decreased decibel level of the sound originating from the audio system 206, a decrease in the temperature of the thermostat 216, and/or a closing of the window coverings, among others. During a less suspenseful scene of the movie, the settings 205 for the environmental devices 220, may include an increase of the lighting levels for the light bulbs 204, a light hue of the light bulbs 204, an increased decibel level of the sound originating from the audio system 206, an increase in the temperature of the thermostat 216, and/or an opening of the window coverings, among others.

Further, after the requesting and in response to receiving, from the settings database 203 of the content provider 202, the first profile 207 during a predetermined period of time, the automation hub 217 may be configured to adjust, while the environmental devices 220 are in operation, the settings of the environmental devices 220 based on the set of parameters of the first profile 207.

In other examples, the automation hub 217 may then receive, from the device 215, a prompt to stop playing the content 211 and start playing additional content on the appliance 213. The device 215 may be a remote controller, a stylus pen, a mouse, or a finger of the user, among other examples. The automation hub 217 may then play the additional content on the appliance 213. Then, the automation hub 217 may request, from the settings database 203 of the content provider 202, a third profile 214 (e.g., another recommended profile) associated with the additional content. The third profile 214 may include additional settings 221. The additional settings 221 may be associated with additional parameters of the environmental devices 220. After receiving the third profile 214 during another predetermined time period, the automation hub 217 may adjust, while the environmental devices 220 are in operation, the settings of the environmental devices 220 based on the additional parameters.

The adjustment of the parameters for the environmental devices 220 based on the first profile 207 or based on the third profile 214 may give the user a more immersive viewing experience within the users home, as the parameters of the environmental devices 220 are adjusted based on the content 211. Further, the content provider 202 may utilize the connection between the components and the automation hub 217 for brand differentiation between content providers. For example, a content provider A may create the set of parameters of the first profile 207 based on light color schemes and warmer temperatures. A content provider B may create the set of parameters of the first profile 207 based on darker color schemes and cooler temperatures. The ability of the content provider 202 to create the set of parameters of the first profile 207 allows each content provider to uniquely brand not only a television show or movie, but also the content provider itself by adjusting the settings of the environmental devices 220 within the home automation system of the user.

FIG. 3 is a flowchart of a process executed by a cognitive analysis service synchronized to an automation hub and to a content provider, where the cognitive analysis service is configured generate a modified profile for parameters of environmental devices connected via a network to the automation hub, in accordance with embodiments of the present invention.

The process 300 of FIG. 3 may be implemented by a cognitive analysis service, a cognitive analysis engine of a computing device, a cognitive analysis application of a computing device, or a cognitive analysis application of a computer system.

The process of FIG. 3 begins at a step 302. The step 302 is followed by a step 304, where a cognitive analysis service (e.g., the cognitive analysis service 108 of FIG. 1 or the cognitive analysis service 208 of FIG. 2) or a cognitive analysis application of a computing device may receive, from a content provider (e.g., the content provider 102 of FIG. 1 or the content provider 202 of FIG. 2) a first profile (e.g., the first profile 207 of FIG. 2) for content (e.g., the content 211 of FIG. 2) being played on an appliance the appliance 213 of FIG. 2) synchronized to an automation hub (e.g., the automation hub 114 of FIG. 1 or the automation hub 217 of FIG. 2).

The first profile (e.g., the first profile 207 of FIG. 2) may include recommended settings (e.g., the settings 205 of FIG. 2). The recommended settings (e.g., the settings 205 of FIG. 2) may be associated with a set of parameters of the environmental devices (e.g., the environmental devices 120 of FIG. 1 or the environmental devices 220 of FIG. 2). Further, the first profile (e.g., the first profile 207 of FIG. 2) may be stored in a settings database (e.g., the settings database 104 of FIG. 1 or the settings database 203 of FIG. 2) of the content provider (e.g., the content provider 102 of FIG. 1 or the content provider 202 of FIG. 2).

The step 304 is followed by a step 306, where the cognitive analysis service (a the cognitive analysis service 108 of FIG. 1 or the cognitive analysis service 208 of FIG. 2) may then receive, from the appliance (e.g., the appliance 113 of FIG. 1 or the appliance 213 of FIG. 2), a second profile (e.g., the second profile 118 of FIG. 1), if the second profile (e.g., the second profile 118 of FIG. 1) is not currently cached for the content. The second profile (e.g., the second profile 118 of FIG. 1) is generated and customized by the user based on the needs and preferences of the user.

For example, if user A is hearing impaired, the user A may create the second profile (e.g., a user profile) with settings of the audio system including a low decibel level. In another example, if a user B suffers from epilepsy, the user B may create the second profile having a low speed for the transition of light changes of the light bulbs. In a further example, if a user C is elderly or experiences light sensitivity, the user C may wish to have the lighting level for the light bulbs set higher.

In another example, if a user D is a child, the parameters for the second profile may include: a higher temperature for the thermostat, a high or bright lighting level for the light bulbs, and/or an openness for the window coverings. In an additional example, if a user E is a sports fan who follows a sports team, the user E may create the second profile to include: a first lighting hue of the light bulbs associated with one color of the sports team, a second lighting hue of the light bulbs associated with another color of the sports team, and a speed at which the light bulbs transition between the first lighting hue and the second lighting hue during a time period. In a further example, if a user F is color blind, the user F may create the second profile with this in mind and may include: a lighting hue of the light bulbs sensitive to the color blindness.

In a subsequent example, if a user G is a music enthusiast, the user G may create the second profile such that parameters of the environmental devices, for fast or upbeat music, may include: a darker lighting level of the light bulbs, an increase in decibel level of the sound originating from the audio system, and a closing of the window coverings. In another example, the user G may create the second profile such that parameters of the environmental devices, for slow or relaxing music, may include: a lighter or brighter lighting level of the light bulbs, a decrease in the decibel level of the sound originating from the audio system and an opening of the window coverings.

In another illustrative example, the second profile may be generated and associated with a project. The project may be a carpentry project to build a table. The environmental devices may include an additional appliance (e.g., a table saw) and the light bulbs. The second profile associated with the carpentry project may include parameters for the environmental devices, such as: an on position for the table saw and an increase in lighting level for the light.

In a further illustrative example, the second profile may be profile of a student. As such, the second profile for the student may include parameters for the light bulbs as being at an increased lighting level. In another illustrative example, the second profile may be associated with hosting a party. As such, the party profile of the user may include parameters for the environmental devices, such as: a decrease in the lighting level of the light bulbs, an increase in a speed at which the light bulbs transition from a first hue to a second hue, an increase in the decibel level of the sound originating from the audio system, and/or a closing of the window coverings.

These examples are merely illustrative, and as such, many other example second profiles (e.g., user profiles) and parameters of the environmental devices are contemplated.

The step 306 is followed by a step 308, where the cognitive analysis service (e.g., the cognitive analysis service 108 of FIG. 1 or the cognitive analysis service 208 of FIG. 2) may then utilize an algorithm to perform an analysis on the second profile (e.g., the second profile 118 of FIG. 1). The algorithm is a deep learning algorithm.

The step 308 is followed by a step 310, where the cognitive analysis service (e.g., the cognitive analysis service 108 of FIG. 1 or the cognitive analysis service 208 of FIG. 2) may identify another set of parameters for the environmental devices (e.g., the environmental devices 120 of FIG. 1 or the environmental devices 220 of FIG. 2). The other set of parameters for the environmental devices (e.g., the environmental devices 120 of FIG. 1 or the environmental devices 220 of FIG. 2) may be associated with user preference settings for the environmental devices (e.g., the environmental devices 120 of FIG. 1 or the environmental devices 220 of FIG. 2).

The step 310 is followed by a step 312, where the cognitive analysis service (e.g., the cognitive analysis service 108 of FIG. 1 or the cognitive analysis service 208 of FIG. 2) may modify the set of parameters associated with the first profile (e.g., the first profile 207 of FIG. 2 or the recommended profile) of the environmental devices (e.g., the environmental devices 120 of FIG. 1 or the environmental devices 220 of FIG. 2) based on the other set of parameters for the second profile (e.g., the second profile 118 of FIG. 1 or the user profile) the environmental devices (e.g., the environmental devices 120 of FIG. 1 or the environmental devices 220 of FIG. 2) to create a modified profile. The other set of parameters, the second profile (e.g., the second profile 118 of FIG. 1), and the modified profile may be stored in a profile database (e.g., the profile database 110 of FIG. 1 or the profile database 210 of FIG. 2) of the cognitive analysis service (e.g., the cognitive analysis service 108 of FIG. 1 or the cognitive analysis service 208 of FIG. 2).

In other examples, if the second profile (e.g., the second profile 118 of FIG. 1) is currently cached for the content, the process may skip the step 304, the step 306, the step 308, and the step 310 and perform the step 312, where the cognitive analysis service (e.g., the cognitive analysis service 108 of FIG. 1 or the cognitive analysis service 208 of FIG. 2) may modify the set of parameters of the environmental devices (e.g., the environmental devices 120 of FIG. 1 or the environmental devices 220 of FIG. 2) based on the other set of parameters for the environmental devices (e.g., the environmental devices 120 of FIG. 1 or the environmental devices 220 of FIG. 2) to create a modified profile.

In an example, the cognitive analysis service (e.g., the cognitive analysis service 108 of FIG. 1 or the cognitive analysis service 208 of FIG. 2) may be further configured to receive, from an appliance (e.g., the appliance 113 of FIG. 1 or the appliance 213 of FIG. 2), modifications to the second profile (e.g., the second profile 118 of FIG. 1) for the content during another predetermined time period. The modifications may include edits to the other set of parameters of the environmental devices (e.g., the environmental devices 120 of FIG. 1 or the environmental devices 220 of FIG. 2).

The cognitive analysis service (e.g., the cognitive analysis service 108 of FIG. 1 or the cognitive analysis service 208 of FIG. 2) may then utilize an algorithm to perform an analysis on the modified second profile. Next, the cognitive analysis service (e.g., the cognitive analysis service 108 of FIG. 1 or the cognitive analysis service 208 of FIG. 2) may identify, based on the analysis, an additional set of parameters for the environmental devices (e.g., the environmental devices 120 of FIG. 1 or the environmental devices 220 of FIG. 2). The additional set of parameters for the environmental devices (e.g., the environmental devices 120 of FIG. 1 or the environmental devices 220 of FIG. 2) are associated with modified user preference settings for the environmental devices (e.g., the environmental devices 120 of FIG. 1 or the environmental devices 220 of FIG. 2).

The cognitive analysis service (e.g., the cognitive analysis service 108 of FIG. 1 or the cognitive analysis service 208 of FIG. 2) may then modify the set of parameters of the environmental devices (e.g., the cognitive analysis service 108 of FIG. 1 or the cognitive analysis service 208 of FIG. 2) based on the additional set of parameters for the environmental devices (e.g., the cognitive analysis service 108 of FIG. 1 or the cognitive analysis service 208 of FIG. 2) to create another modified profile. The other modified profile may be stored in the profile database (e.g., the profile database 110 of FIG. 1 or the profile database 210 of FIG. 2) of the cognitive analysis service (e.g., the cognitive analysis service 108 of FIG. 1 or the cognitive analysis service 208 of FIG. 2).

The step 312 is followed by a step 314, which concludes the process.

FIG. 4 is a block diagram of a computing device included within the system of FIG. 1 and that implements the processes of FIG. 3, in accordance with embodiments of the present invention.

In some embodiments, the present invention may be a system, a method, a service, and/or a computer program product. For example, an automation hub (e.g., the automation hub 114 of FIG. 1 or the automation hub 217 of FIG. 2) may be configured to adjust settings of environmental devices (e.g., the environmental devices 120 of FIG. 1 or the environmental devices 220 of FIG. 2) connected via a network to the automation hub (e.g., the automation hub 114 of FIG. 1 or the automation hub 217 of FIG. 2).

Further, a cognitive analysis service (e.g., the cognitive analysis service 108 of FIG. 1 or the cognitive analysis service 208 of FIG. 2) may be synchronized to the automation hub (e.g., the automation hub 114 of FIG. 1 or the automation hub 217 of FIG. 2) and to a content provider (e.g., the content provider 102 of FIG. 1 or the content provider 202 of FIG. 2). The cognitive analysis service (e.g., the cognitive analysis service 108 of FIG. 1 or the cognitive analysis service 208 of FIG. 2) may be configured to generate a modified profile for parameters of environmental devices (e.g., the environmental devices 120 of FIG. 1 or the environmental devices 220 of FIG. 2) connected via the network to the automation hub (e.g., the automation hub 114 of FIG. 1 or the automation hub 217 of FIG. 2).

In an example, basic configuration 402, the computing device 400 includes one or more processors 404 and a system memory 406. A memory bus 408 is used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, an example processor core 414, and registers 416, among other examples. The example processor core 414 may include an arithmetic logic unit (ALU), a floating point unit (FPU), a digital signal processing core (DSP Core), or any combination thereof. An example memory controller 418 is used with the processor 404, or in some implementations the example memory controller 418 is an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 includes an operating system 420, one or more engines, such as a cognitive analysis engine 422, and program data 424, among other engines/modules. In some embodiments, the cognitive analysis engine 422 may be a cognitive analysis application or a cognitive analysis service.

The cognitive analysis engine 422 may receive a first profile (e.g., the first profile 207 of FIG. 2) for content (e.g., the content 211 of FIG. 2) being played on an appliance (e.g., the appliance 113 of FIG. 1 or the appliance 213 of FIG. 2) synchronized to the automation hub (e.g., the automation hub 114 of FIG. 1 or the automation hub 217 of FIG. 2). The first profile (e.g., the first profile 207 of FIG. 2) may include a set of parameters and recommended settings (e.g., the settings 205 of FIG. 2) of the environmental devices (e.g., the environmental devices 120 of FIG. 1 or the environmental devices 220 of FIG. 2).

If a second profile (e.g., the second profile 118 of FIG. 1) is not currently cached for the content the cognitive analysis engine 422 may then receive, from the appliance (e.g., the appliance 113 of FIG. 1), a second profile (e.g., the second profile 118 of FIG. 1). Next, the cognitive analysis engine 422 may utilize an algorithm to perform an analysis on the second profile (e.g., the second profile 118 of FIG. 1).

In response to the analysis, the cognitive analysis engine 422 may identify another set of parameters for the environmental devices (e.g., the environmental devices 120 of FIG. 1). The other set of parameters for the environmental devices (e.g., the environmental devices 120 of FIG. 1) may be associated with user preference settings for the environmental devices (e.g., the environmental devices 120 of FIG. 1). Then, the cognitive analysis engine 422 may modify the set of parameters of the environmental devices (e.g., the environmental devices 120 of FIG. 1) based on the other set of parameters for the environmental devices to create a modified profile.

In another example, if the second profile (e.g., the second profile 118 of FIG. 1) is currently cached for the content, the cognitive analysis engine 422 may generate the modified profile based on parameters for the environmental devices the environmental devices 120 of FIG. 1) of the second profile (e.g., the second profile 118 of FIG. 1).

The computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives, among others. Example computer storage media includes volatile and non-volatile, removable and non-removable media implemented in any method or technology for storage of information, such as computer-readable instructions, data structures, program modules, or other data.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which is configured to communicate to various external devices such as a display or speakers via one or more A/V ports 452. The one or more peripheral interfaces 444 includes a serial interface controller 454 or a parallel interface controller 456, which are configured to communicate with external devices, such as input devices (e.g., keyboard, mouse, pen, voice input device, touch input device, etc.) or other peripheral devices (e.g., printer, scanner, etc.) via one or more I/O ports 458. An example of the one or more communication devices 466 include a network controller 460, which are arranged to facilitate communications with one or more other computing devices 462 over a network communication link via one or more communication ports 464. The one or more other computing devices 462 include servers, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media include wired media, such as a wired network or direct-wired connection, and wireless media, such as acoustic, radio frequency (RF), microwave, infrared (IR), and other wireless media. The term "computer-readable media," as used herein, includes both storage media and communication media.

The system memory 406, the removable storage devices 436, and the non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

Aspects of the present invention are described herein regarding schematic diagrams (e.g., FIG. 2), flowchart illustrations (e.g., FIG. 3) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by the computer-readable instructions (e.g., the program code).

The computer-readable instructions are provided to the processor 404 of a general purpose computer, special purpose computer, or other programmable data processing apparatus (e.g., the computing device 400) to produce a machine, such that the instructions, which execute via the processor 404 of the computer or other programmable data processing apparatus, create means for implementing the functions/acts specified in the flowchart and/or block diagram block or blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable instructions (e.g., the program code) are also loaded onto a computer (e.g. the computing device 400), another programmable data processing apparatus, or another device to cause a series of operational steps to be performed on the computer, the other programmable apparatus, or the other device to produce a computer implemented process, such that the instructions which execute on the computer, the other programmable apparatus, or the other device implement the functions/acts specified in the flowchart and/or block diagram block or blocks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smartalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computing device 400 may be implemented as a part of a general purpose or specialized server, mainframe, or similar computer that includes any of the above functions. The computing device 400 may also be implemented as a personal computer including both laptop computer and non-laptop computer configurations.

Another embodiment of the invention provides a method that performs the process steps on a subscription, advertising and/or fee basis. That is, a service provider, such as a Solution Integrator, can offer to create, maintain, and/or support, etc. a process of adjusting settings of environmental devices connected via a network to the automation hub. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method to adjust settings of environmental devices in a home automation network, said method comprising:

receiving, by an automation hub from a prompting device selected from the group consisting of a remote controller, a stylus pen, a mouse, or a finger of a user, a prompt to start playing video content on a screen of an appliance during a time period, wherein the video content advances in time as the video content is being played, wherein the automation hub is a hardware device that connects multiple devices in the home automation network and controls communications among the multiple devices, wherein the multiple devices comprise a cognitive analysis computing device, a settings database of a content provider, and the appliance, and wherein the input device is communicatively connected to the appliance;

in response to the received prompt, playing on the screen of the appliance the video content during the time period;

after a first profile stored in the settings database has been requested and in response to receiving, by the automation hub from the settings database, the first profile during a predetermined period of time, adjusting, by the automation hub while the environmental devices are in operation, settings of the environment devices based on a first set of parameters stored in the settings database, wherein the first profile is associated with the video content, wherein the settings database is accessible to the content provider and located external to both the content provider and the appliance, wherein the first profile includes the settings of the environmental devices and the first set of parameters for adjusting the settings of the environmental devices, wherein the first set of parameters is based on the video content being played on the screen of the appliance, and wherein the video content was branded by the content provider;

receiving, by the automation hub from the appliance, a second profile comprising a second set of parameters for adjusting the settings of the environmental devices, wherein the second set of parameters is based on user preferences of the user, and wherein the profile database and the settings database are different databases;

receiving, by the cognitive analysis computing device from the automation hub, the second profile;

utilizing, by the cognitive analysis computing device, an algorithm to perform an analysis of the second profile;

identifying, by the cognitive analysis computing device, from the analysis of the second profile, the second set of parameters for adjusting the settings of the environmental devices;

modifying, by the cognitive analysis computing device, the first set of parameters of the environmental devices, said modifying being based on the second set of parameters;

creating, by the cognitive analysis computing device from said modifying, a modified profile in accordance with the user preferences;

storing, by the cognitive analysis computing device, the modified profile in the profile database; and communicating, by the cognitive analysis computing device to the content provider, the second set of parameters based on the user preferences, said second set of parameters communicated to the content provider giving the content provider a competitive advantage, with respect to said adjusting the settings of the environmental devices, said competitive advantage being over content providers not receiving the second set of parameters, wherein the automation hub is synchronized to the settings database and to the cognitive analysis computing device, wherein the settings database is synchronized to the content provider, wherein the content provider is synchronized to the cognitive analysis computing device, and wherein the appliance is synchronized to the automation hub.

2. The method of claim 1, wherein the environmental devices include a thermostat, and wherein said adjusting the settings of the environment devices based on the first set of parameters comprises setting a speed at which the thermostat transitions between a first temperature and a second temperature during the time period.

3. The method of claim 1, wherein the environmental devices include light bulbs, and wherein said adjusting the settings of the environment devices based on the first set of parameters comprises setting a speed at which the light bulbs transition between a first hue and a second hue.

4. The method of claim 1, wherein the environmental devices include an audio system, and wherein said adjusting the settings of the environment devices based on the first set of parameters comprises setting a speed at which the audio system transitions between a first decibel level and a second decibel level.

5. The method of claim 1, wherein the environmental devices include a window covering, and wherein said adjusting the settings of the environment devices based on the first set of parameters comprises setting an openness level of the window covering.

6. The method of claim 1, wherein the environmental devices include an additional appliance, and wherein said adjusting the settings of the environment devices based on the first set of parameters comprises setting an on position or an off position of the additional appliance.

7. The method of claim 1, said method further comprising:
receiving, by the automation hub from the prompting device, a prompt to stop playing the video content and start playing additional video content on the appliance; and
playing the additional video content on the appliance.

8. The method of claim 7, said method further comprising:
after said requesting, in response to receiving, from the settings database, the second profile during another predetermined time period, adjusting by automation hub, while the environmental device are in operation, the settings of the environment devices based on the second set of parameters of said environmental devices.

9. A computer system, comprising one or more processors, one or more memories, and one or more computer-readable hardware storage devices, said one or more computer-readable hardware storage devices containing program code executable by said one or more processors via said one or more memories to implement a method to adjust settings of environmental devices in a home automation network, said method comprising:

receiving, by an automation hub from a prompting device selected from the group consisting of a remote controller, a stylus pen, a mouse, or a finger of a user, a prompt to start playing video content on a screen of an appliance during a time period, wherein the video content advances in time as the video content is being played, wherein the automation hub is a hardware device that connects multiple devices in the home automation network and controls communications among the multiple devices, wherein the multiple devices comprise a cognitive analysis computing device, a settings database of a content provider, and the appliance, and wherein the input device is communicatively connected to the appliance;

in response to the received prompt, playing on the screen of the appliance the video content during the time period;

after a first profile stored in the settings database has been requested and in response to receiving, by the automation hub from the settings database, the first profile during a predetermined period of time, adjusting, by the automation hub while the environmental devices are in operation, settings of the environment devices based on a first set of parameters stored in the settings database, wherein the first profile is associated with the video content, wherein the settings database is accessible to the content provider and located external to both the content provider and the appliance, wherein the first profile includes the settings of the environmental devices and the first set of parameters for adjusting the settings of the environmental devices, wherein the first set of parameters is based on the video content being played on the screen of the appliance, and wherein the video content was branded by the content provider;

receiving, by the automation hub from the appliance, a second profile comprising a second set of parameters for adjusting the settings of the environmental devices, wherein the second set of parameters is based on user preferences of the user, and wherein the profile database and the settings database are different databases;

receiving, by the cognitive analysis computing device from the automation hub, the second profile;

utilizing, by the cognitive analysis computing device, an algorithm to perform an analysis of the second profile;

identifying, by the cognitive analysis computing device, from the analysis of the second profile, the second set of parameters for adjusting the settings of the environmental devices;

modifying, by the cognitive analysis computing device, the first set of parameters of the environmental devices, said modifying being based on the second set of parameters;

creating, by the cognitive analysis computing device from said modifying, a modified profile in accordance with the user preferences;

storing, by the cognitive analysis computing device, the modified profile in the profile database; and communicating, by the cognitive analysis computing device to the content provider, the second set of parameters based on the user preferences, said second set of parameters communicated to the content provider giving the content provider a competitive advantage, with respect to said adjusting the settings of the environmental devices, said competitive advantage being over content providers not receiving the second set of parameters, wherein the automation hub is synchronized to the settings database and to the cognitive analysis computing device, wherein the settings database is synchronized to the content provider, wherein the content provider is synchronized to the cognitive analysis computing device, and wherein the appliance is synchronized to the automation hub.

10. The computer system of claim 9, wherein the algorithm is a deep learning algorithm.

11. The computer system of claim 9, said method further comprising:

receiving, by the cognitive analysis computing device from the appliance, modifications to the second profile for the content during another predetermined time period, wherein the modifications include edits to the second set of parameters of the environmental devices; and utilizing, by the cognitive analysis computing device, one algorithm to perform an analysis on the modified second profile.

12. The computer system of claim 11, said method further comprising:

in response to the analysis on the modified second profile, identifying, by the one or more processors, a third set of parameters for the environmental devices, wherein the third set of parameters for the environmental devices are associated with modified user preference settings for the environmental devices;

modifying, by the cognitive analysis computing device, the first set of parameters of the environmental devices based on the third set of parameters for the environmental devices to create another modified profile; and storing, by the cognitive analysis computing device, other modified profile in the profile database of the cognitive analysis service.

13. A computer program product, comprising one or more computer-readable hardware storage devices having computer-readable program code stored therein, said computer-readable program code containing instructions executable by one or more processors of a computer system to implement a method to adjust settings of environmental devices in a home automation network, said method comprising:

receiving, by an automation hub from a prompting device selected from the group consisting of a remote controller, a stylus pen, a mouse, or a finger of a user, a prompt to start playing video content on a screen of an appliance during a time period, wherein the video content advances in time as the video content is being played, wherein the automation hub is a hardware device that connects multiple devices in the home automation network and controls communications among the multiple devices, wherein the multiple devices comprise a cognitive analysis computing device, a settings database of a content provider, and the appliance, and wherein the input device is communicatively connected to the appliance;

in response to the received prompt, playing on the screen of the appliance the video content during the time period;

after a first profile stored in the settings database has been requested and in response to receiving, by the automation hub from the settings database, the first profile during a predetermined period of time, adjusting, by the automation hub while the environmental devices are in operation, settings of the environment devices based on a first set of parameters stored in the settings database, wherein the first profile is associated with the video content, wherein the settings database is accessible to the content provider and located external to both the content provider and the appliance, wherein the first profile includes the settings of the environmental devices and the first set of parameters for adjusting the settings of the environmental devices, wherein the first set of parameters is based on the video content being played on the screen of the appliance, and wherein the video content was branded by the content provider;

receiving, by the automation hub from the appliance, a second profile comprising a second set of parameters for adjusting the settings of the environmental devices, wherein the second set of parameters is based on user preferences of the user, and wherein the profile database and the settings database are different databases;

receiving, by the cognitive analysis computing device from the automation hub, the second profile;

utilizing, by the cognitive analysis computing device, an algorithm to perform an analysis of the second profile;

identifying, by the cognitive analysis computing device, from the analysis of the second profile, the second set of parameters for adjusting the settings of the environmental devices;

modifying, by the cognitive analysis computing device, the first set of parameters of the environmental devices, said modifying being based on the second set of parameters;

creating, by the cognitive analysis computing device from said modifying, a modified profile in accordance with the user preferences;

storing, by the cognitive analysis computing device, the modified profile in the profile database; and communicating, by the cognitive analysis computing device to the content provider, the second set of parameters based on the user preferences, said second set of parameters communicated to the content provider giving the content provider a competitive advantage, with respect to said adjusting the settings of the environmental devices, said competitive advantage being over content providers not receiving the second set of parameters, wherein the automation hub is synchronized to the settings database and to the cognitive analysis computing device, wherein the settings database is synchronized to the content provider, wherein the content provider is synchronized to the cognitive analysis computing device, and wherein the appliance is synchronized to the automation hub.

14. The computer program product of claim 13, said method further comprising:

receiving, by the automation hub from the prompting device, a prompt to stop playing the video content and start playing additional video content on the appliance; and playing, by the automation hub, the additional video content on the appliance.

15. The computer system of claim 9, wherein the environmental devices include a thermostat, and wherein said adjusting the settings of the environment devices based on the first set of parameters comprises setting a speed at which the thermostat transitions between a first temperature and a second temperature during the time period.

16. The computer system of claim 9, wherein the environmental devices include light bulbs, and wherein said adjusting the settings of the environment devices based on the first set of parameters comprises setting a speed at which the light bulbs transition between a first hue and a second hue.

17. The computer system of claim 9, wherein the environmental devices include an audio system, and wherein said adjusting the settings of the environment devices based on the first set of parameters comprises setting a speed at which the audio system transitions between a first decibel level and a second decibel level.

18. The computer program product of claim 13, wherein the environmental devices include a thermostat, and wherein said adjusting the settings of the environment devices based on the first set of parameters comprises setting a speed at which the thermostat transitions between a first temperature and a second temperature during the time period.

19. The computer program product of claim 13, wherein the environmental devices include light bulbs, and wherein said adjusting the settings of the environment devices based on the first set of parameters comprises setting a speed at which the light bulbs transition between a first hue and a second hue.

20. The computer program product of claim 13, wherein the environmental devices include an audio system, and wherein said adjusting the settings of the environment devices based on the first set of parameters comprises setting a speed at which the audio system transitions between a first decibel level and a second decibel level.

* * * * *